United States Patent
Polycarpou et al.

(10) Patent No.: US 12,473,978 B2
(45) Date of Patent: Nov. 18, 2025

(54) FLUID SEALING OF MOVING SHAFTS FOR HIGH-PRESSURE CHAMBERS

(71) Applicant: The Texas A&M University System, College Station, TX (US)

(72) Inventors: Andreas A. Polycarpou, College Station, TX (US); Pixiang Lan, Urbana, IL (US); Md Saifur Rahman, College Station, TX (US)

(73) Assignee: The Texas A&M University System, College Station, TX (US)

( * ) Notice: Subject to any disclaimer, the term of this patent is extended or adjusted under 35 U.S.C. 154(b) by 115 days.

(21) Appl. No.: 17/743,782

(22) Filed: May 13, 2022

(65) Prior Publication Data

US 2022/0364646 A1    Nov. 17, 2022

Related U.S. Application Data

(60) Provisional application No. 63/188,032, filed on May 13, 2021.

(51) Int. Cl.
*F16J 15/34*    (2006.01)

(52) U.S. Cl.
CPC .................. *F16J 15/34* (2013.01)

(58) Field of Classification Search
CPC .................. F16J 15/34; F16J 15/40
See application file for complete search history.

(56) References Cited

U.S. PATENT DOCUMENTS

| | | | | |
|---|---|---|---|---|
| 3,144,035 A | * | 8/1964 | Hablanian | F16L 23/00 417/208 |
| 3,943,717 A | * | 3/1976 | Schexnayder | F16J 15/004 277/513 |
| 4,108,447 A | * | 8/1978 | Scholin | F16J 15/3268 277/572 |
| 4,128,248 A | * | 12/1978 | Kabelitz | F16J 15/54 277/927 |
| 4,189,157 A | * | 2/1980 | Mahan | F16J 15/40 277/432 |
| 4,500,097 A | * | 2/1985 | Sakamoto | G01D 5/34769 277/549 |
| 4,534,569 A | * | 8/1985 | Ishitani | F16J 15/46 277/351 |
| 4,890,849 A | * | 1/1990 | Eason | F16J 15/46 277/422 |
| 5,031,509 A | * | 7/1991 | Cowan | F15B 15/149 91/222 |
| 5,607,165 A | * | 3/1997 | Bredemeyer | F16K 41/003 277/910 |
| 5,636,847 A | * | 6/1997 | Ostrowski | F16J 15/3448 277/432 |

(Continued)

*Primary Examiner* — Vishal A Patel
(74) *Attorney, Agent, or Firm* — Jackson Walker LLP

(57) ABSTRACT

A tribometer includes a main chamber to conduct testing under controlled environmental conditions, such as different chamber pressures and different temperatures. A shaft extends through the main chamber to initiate component movement inside the main chamber. A secondary fluid seal chamber is formed in a wall of the main chamber around each shaft. A first seal is formed around the shaft on a first side of the secondary chamber. A second seal is formed around the shaft on a second side of the secondary chamber.

20 Claims, 6 Drawing Sheets

(56) References Cited

U.S. PATENT DOCUMENTS

| | | | | |
|---|---|---|---|---|
| 5,921,554 | A * | 7/1999 | Derian | F16J 15/162 |
| | | | | 277/516 |
| 6,050,572 | A * | 4/2000 | Balsells | F16J 15/3236 |
| | | | | 277/572 |
| 6,161,834 | A * | 12/2000 | Pollack | F16L 17/10 |
| | | | | 277/560 |
| 6,161,835 | A * | 12/2000 | Arbuckle | F16J 15/406 |
| | | | | 277/320 |
| 6,805,487 | B1 * | 10/2004 | Yuasa | B23Q 11/0883 |
| | | | | 277/913 |
| 7,118,114 | B2 * | 10/2006 | Burdick | F16J 15/406 |
| | | | | 277/516 |
| 7,210,687 | B2 * | 5/2007 | Takahashi | F16J 15/3404 |
| | | | | 277/362 |
| 7,426,936 | B2 * | 9/2008 | Gessaman | F16K 41/003 |
| | | | | 277/320 |
| 8,608,176 | B2 * | 12/2013 | Bachhofner | F16J 15/406 |
| | | | | 277/562 |
| 10,359,113 | B2 * | 7/2019 | Bergamini | F16J 15/46 |
| 2004/0119240 | A1 * | 6/2004 | Hashimoto | F16J 15/3236 |
| | | | | 277/432 |
| 2008/0240949 | A1 * | 10/2008 | Tackett | F16J 15/406 |
| | | | | 277/304 |

* cited by examiner

FLUID SEALING OF MOVING SHAFTS FOR HIGH-PRESSURE CHAMBERS

CROSS-REFERENCE TO RELATED APPLICATIONS

This application claims priority to, and incorporates by reference the entire disclosure of U.S. Provisional Patent Application No. 63/188,032, filed on May 13, 2021. The entire disclosure of U.S. Provisional Patent Application No. 63/025,253, filed on May 15, 2020 is incorporated by reference.

TECHNICAL FIELD

The present disclosure relates generally to tribometry and more particularly, but not by way of limitation to a high-pressure chamber having fluid seals for simulating high-pressure tribological performance.

BACKGROUND

This section provides background information to facilitate a better understanding of the various aspects of the disclosure. It should be understood that the statements in this section of this document are to be read in this light, and not as admissions of prior art.

A tribometer (also known as a friction and wear tester) is a machine to measure the tribological performance, including friction, wear, and lubrication properties of bearing materials and lubricants. Tribological testing using a tribometer is very important in any kind of bearing material and lubricant research and development. A typical tribometer has a stationary part and a moving part, or two moving parts, where the two testing samples are attached and rubbed against each other.

SUMMARY

Aspects of the disclosure relate to a tribometer. The tribometer includes a main chamber to conduct testing under controlled environmental conditions, such as different chamber pressures and different temperatures. Shafts extend through the main chamber to initiate component movement inside the main chamber. A secondary fluid seal chamber is formed in a wall of the main chamber around each shaft. A first seal is formed around the shaft on a first side of the secondary chamber. A second seal is formed around the shaft on a second side of the secondary chamber.

This summary is provided to introduce a selection of concepts that are further described below in the Detailed Description. This summary is not intended to identify key or essential features of the claimed subject matter, nor is it to be used as an aid in limiting the scope of the claimed subject matter.

BRIEF DESCRIPTION OF THE DRAWINGS

A more complete understanding of the subject matter of the present disclosure may be obtained by reference to the following Detailed Description when taken in conjunction with the accompanying Drawings wherein.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

Most tribometers are capable of testing materials and lubricants under ambient pressure conditions. However, to measure the tribological performance more accurately, the best way is to use a tribometer to simulate the actual working conditions of the tribopairs. For example, to test a polymeric journal bearing with a metallic shaft designed for outer space applications, a block-on-ring configuration (stationary polymer block contacts with a rotating shaft) to test the polymeric bearing material in an environment that simulates outer space conditions, such as vacuum, low and high temperature, suitable speed and load can be utilized. High environmental pressure working conditions are also common in many applications, such as oil and gas drilling; electrical submersible pumps in oil and gas wells, high-pressure compressors, air conditioning compressors, and other applications. To simulate working conditions of the moving parts under these extreme pressures (ranging from vacuum to 27 MPa (or 4000 PSI)), having moving shafts passing through the high-pressure chamber is very challenging. This is primarily due to the high-pressure medium (typically gas) that is prone to leaking past the moving/rotating shaft and, thus, could alter the conditions inside the chamber. Limited high-pressure tribo-chambers exist. These high-pressure chambers often exhibit leakage in the vicinity of the rotating shaft. Such an arrangement could be dangerous in the case of flammable gases.

Figure 1:
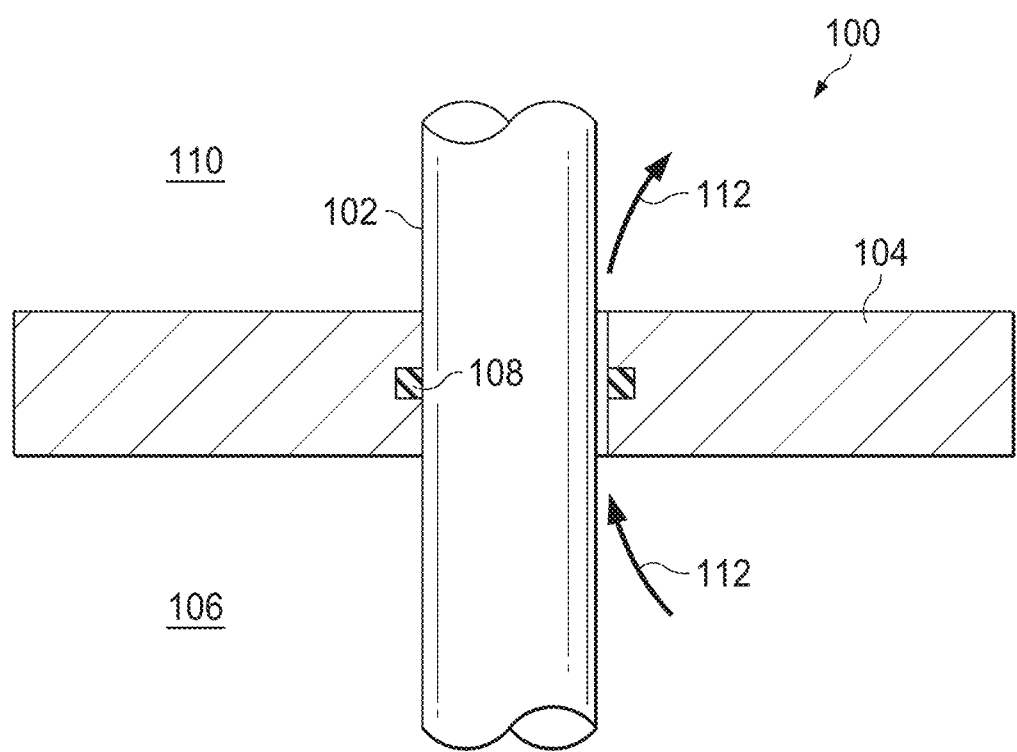
FIG. 1 is a diagram of an existing high-pressure tribometer illustrating fluid leakage therethrough.

FIG. 1 is a schematic illustrating a device 100 operating at high pressure and having a moving shaft 102 rotating or sliding through a wall 104 of chamber 106 and requires a sealing system 108 for the moving shaft 102 to maintain precise control of pressure within chamber 106. Sealing system 108 may include, for example, a lip seal, a mechanical seal, or the like. Chamber 106 is at a higher pressure than an exterior area 110, which may be at, for example, ambient pressure. For ultra-high-pressure conditions, leakage of fluid, which is typically gas, from chamber 106 (illustrated by arrows 112) around the moving shaft 102 is inevitable. To maintain gas pressure in chamber 106, supplementary fluid needs to be continuously supplied. Thus, the gas composition inside chamber 106 is always changing and in a dynamic condition.

Figure 2A:
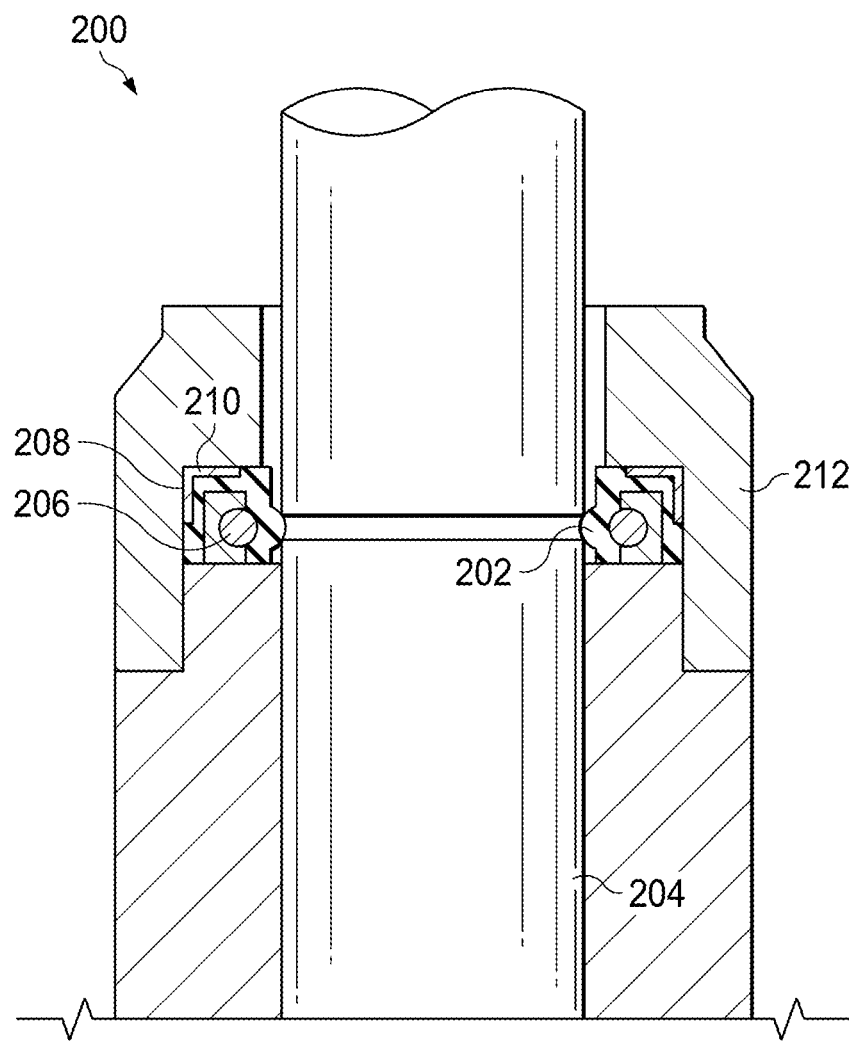
FIGS. 2A-2C are schematic diagrams illustrating existing tribometer seals.
Figure 2B:
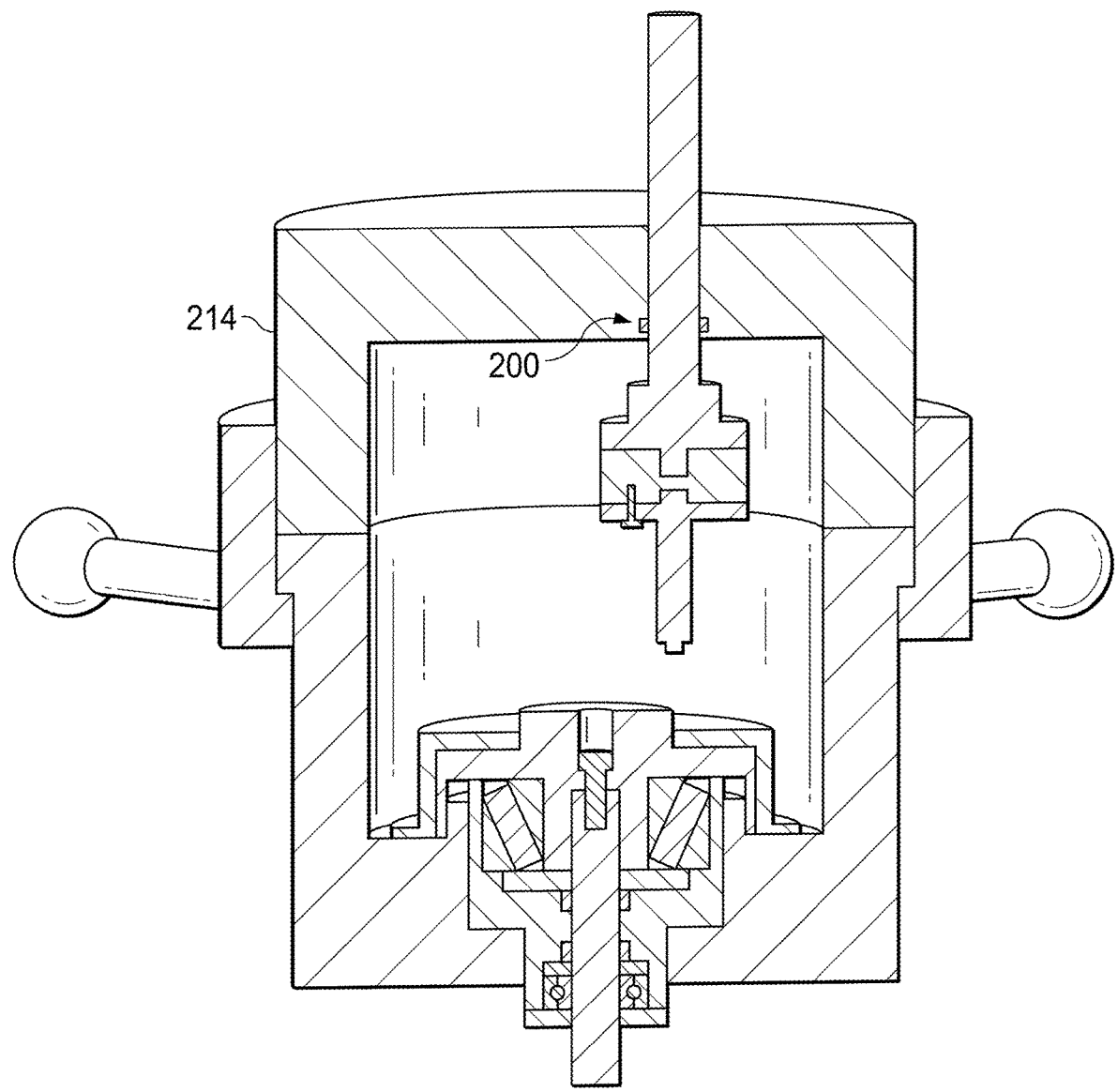
Figure 2C:
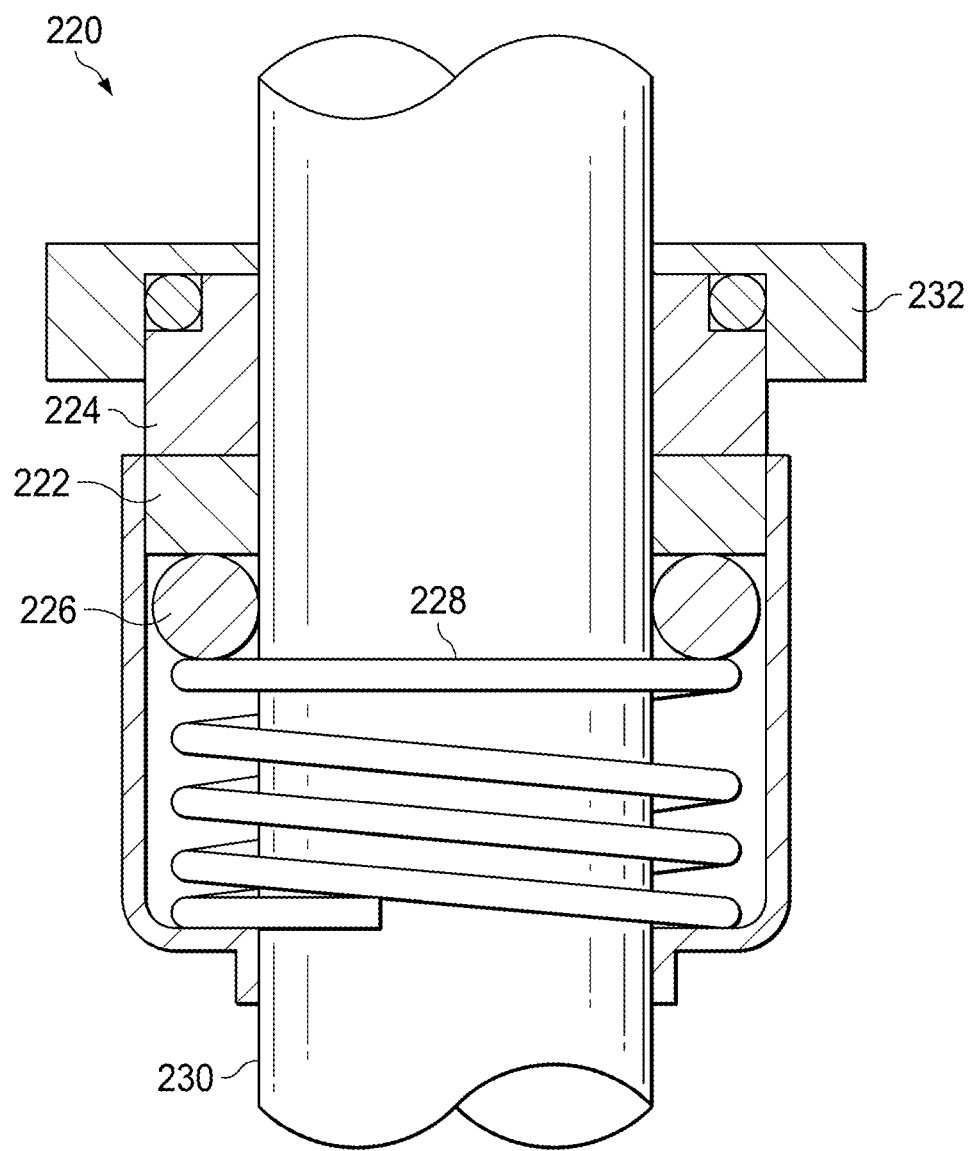

FIGS. 2A and 2B illustrate a lip seal 200 and FIG. 2C illustrates a mechanical seal 220. Referring to FIG. 2A, lip seal 200 includes a seal lip 202 that contacts an outer surface of a moving shaft 204. Seal lip 202 is biased into contact with moving shaft 204 via a radial spring 206. Lip seal 200 includes an outer seal 208 and may include other features like a stiffener 210. Lip seal 200 is seated in, for example, a housing 212 of a pump. FIG. 2B illustrates lip seal 200 installed in a tribometer 214. Referring to FIG. 2C, mechanical seal 220 includes a rotating seal face 222, a stationary seal face 224, a secondary seal 226, and a spring 228. Rotating seal face 222 is seated on and moves with a moving shaft 230. Stationary seal face 224 is fitted to a housing 232 and does not rotate relative to moving shaft 230. Spring 228 biases secondary seal 226 against rotating seal face 222. Mechanical seals typically rely upon lubrication between faces 222, 224 via a hydrodynamic film, which can be formed from the liquid being pumped or a separate barrier fluid. Mechanical seals and lip seals are the most common seals used for rotary/sliding shafts, such as moving shaft 102. These seals work well at low pressures, but at high pressures (e.g., >1000 psi) the leakage rate increases, especially for gaseous fluid. For example, a current ultra-high-pressure tribometer works at, for example, 2000 psi gas pressure and uses bushings and a rotary lip seal. During operation, it is required to recharge new gas into the chamber to maintain the precise gas pressure within the chamber.

To address the leaking of gas through the shaft from the chamber, aspects of the disclosure utilize a second smaller sealing gas chamber (termed a gas buffer chamber) surrounding the shaft. A pair of seals on the shaft separate the buffer chamber from the main chamber and an exterior of the main chamber. When the main chamber and the buffer chamber are pressurized with the same high-pressure medium (typically gas), the buffer chamber can balance the main chamber pressure on the seal that divides the main chamber and the buffer chamber, thus there will be no leakage from the main chamber. The buffer chamber is sealed from an exterior of the main chamber by a second seal. If there is any leakage or pressure drop, pressure can be maintained by continuously supplying more high-pressure gas. The double chamber/sealing technology prevents leaking of gas around the moving shaft from the high-pressure chamber, thus enabling stabilized working/simulating conditions for testing, and safer use of flammable gases.

Figure 3:
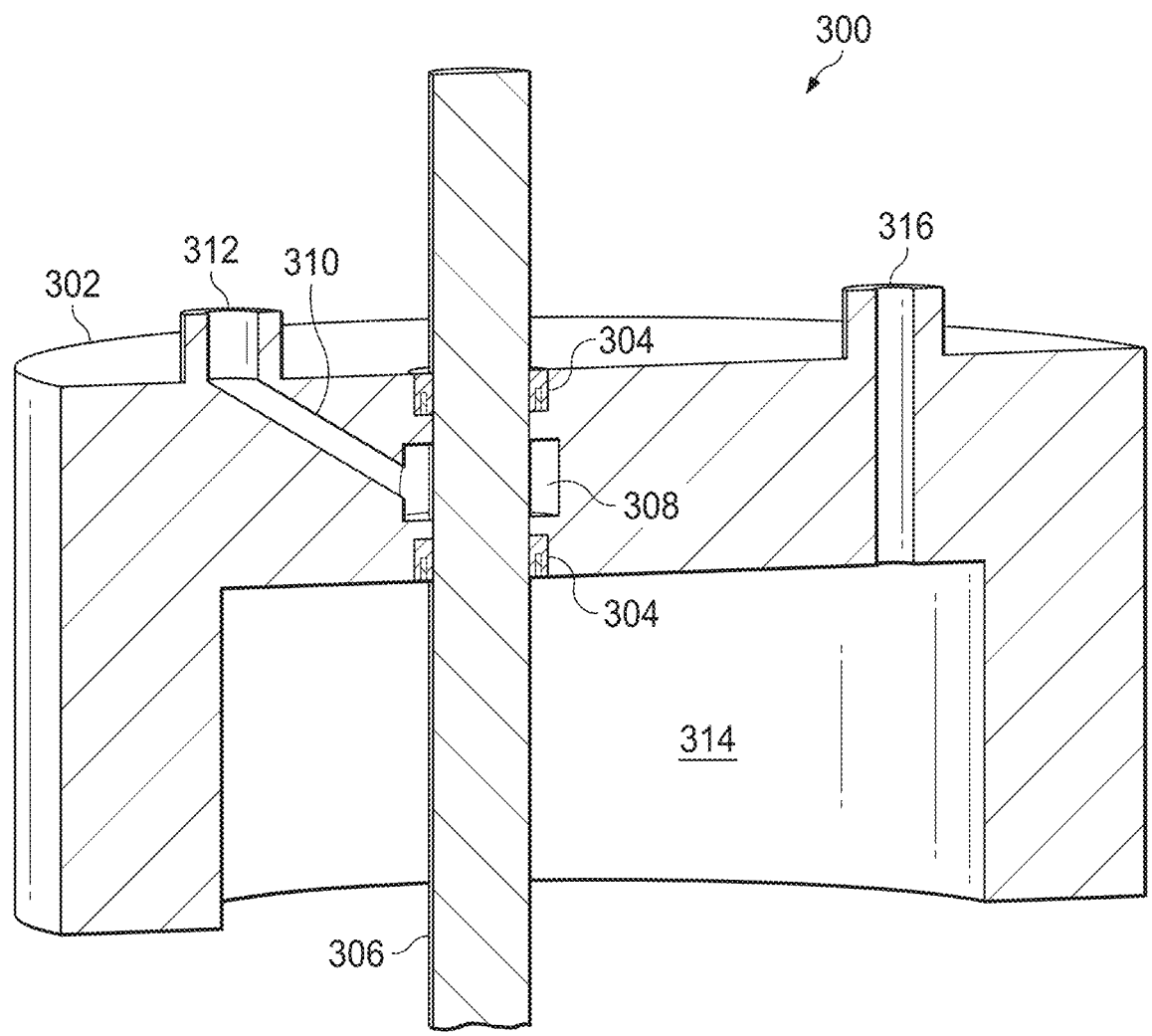
FIG. 3 is a schematic diagram of a fluid sealing system of an ultra-high pressure chamber according to aspects of the disclosure.
Figure 4:
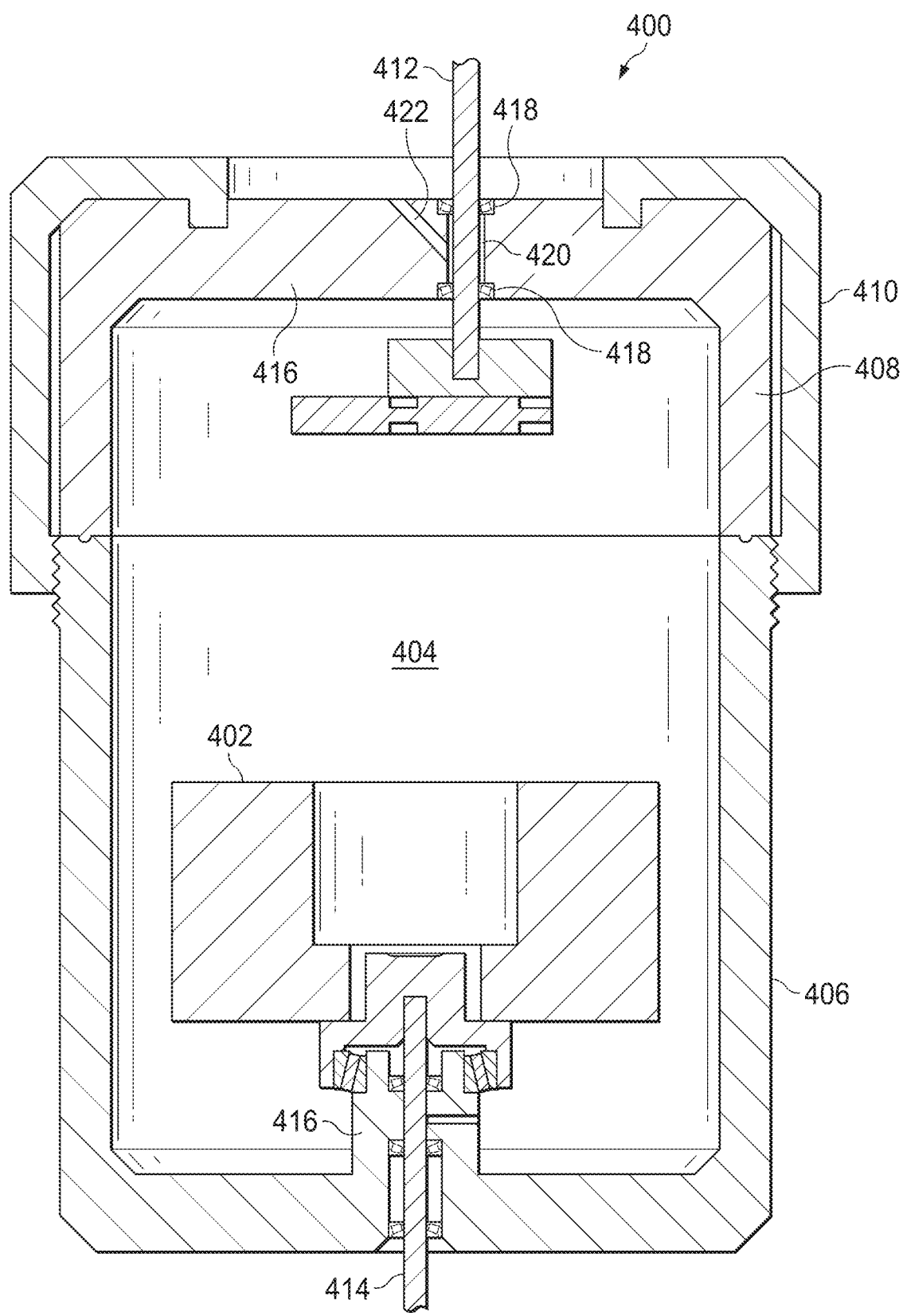
FIG. 4 is a schematic diagram of a tribometer with a heating stage according to aspects of the disclosure.

FIG. 3 illustrates a sealing system 300 for use with a tribometer 302, according to aspects of the disclosure. Sealing system 300 includes two high-pressure seals 304 that are disposed around a moving shaft 306. A buffer chamber 308 encircles moving shaft 306 and is located axially between the two high-pressure seals 304. Each seal 304 may be, for example, a lip seal, a mechanical seal, an o-ring, or the like. As shown in FIG. 3, buffer chamber 308 has cylindrical shape formed concentrically around moving shaft 306. In other aspects, buffer chamber 308 may have a different shape so long as a chamber is formed between the two high-pressure seals 304. FIG. 4 illustrates a different configuration for a buffer chamber that performs in a similar manner to buffer chamber 308. A conduit 310 connects buffer chamber 308 to a port 312. Conduit 310 and port 312 allow a fluid to be supplied to buffer chamber 308. In some aspects, fluid is supplied to buffer chamber 308 at a pressure that is higher than the pressure within a main testing chamber 314. The pressure differential between buffer chamber 308 and main testing chamber 314 prevents leakage of fluid from main testing chamber 314 through the two high-pressure seals 304/buffer chamber 308. The high-pressure fluid in main testing chamber 314 can thus be sealed and maintains a stable composition and pressure. A port 316 allows the pressure within main testing chamber 314 to be controlled independently of buffer chamber 308. In some aspects, fluid may be supplied to buffer chamber 308 so that the pressure therein is equal to or less than the pressure of buffer chamber 308. In some aspects, fluid supplied to buffer chamber 308 is the same fluid supplied to main testing chamber 314. In some aspects, different fluids may be supplied to buffer chamber 308 and main testing chamber 314.

FIG. 4 illustrates the general construction of a tribometer 400 with a heating stage 402. A main high-pressure chamber 404 is contained within a bottom drum 406 and a top drum 408, with a sealing cap 410 that holds drums 406, 408 together to hold pressure within high-pressure chamber 404. Tribometer 400 includes a sliding shaft 412 at the top and a rotating shaft 414 in the bottom. Sealing systems 416, similar to sealing system 300 of FIG. 3, are positioned around sliding shaft 412 and rotating shaft 414 to prevent leakage of fluid from high-pressure chamber 404. Each sealing system 416 includes a pair of seals 418, a buffer chamber 420 disposed between the pair of seals 418, and a conduit 422 that is fluidly coupled to buffer chamber 420. Each seal 418 may be, for example, a lip seal, a mechanical seal, an o-ring, or the like.

In the aspects illustrated in FIG. 4, sealing systems 416 utilize buffer chambers 420 with a different profile compared to buffer chamber 308, however the function is similar in that buffer chambers 420 provide a volume that surrounds shaft 412, 414, respectively, in which the pressure may be controlled independently from high-pressure chamber 404 to prevent leakage from high-pressure chamber 404.

By way of example, aspects of the disclosure have been described herein with reference to a tribometer. In other embodiments, aspects of the disclosure could be applied to any type of high-pressure sealing application with or without the use of a tribometer.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an," and other singular terms are intended to include the plural forms thereof unless specifically excluded.

What is claimed is:

1. A sealing system, comprising:
  a main chamber having a fluid medium disposed therein;
  a shaft extending through a bore formed through an exterior surface of a wall of the main chamber;

a buffer chamber formed between the exterior surface and an oppositely facing interior surface of the wall of the main chamber and around the shaft, the buffer chamber having a diameter that is greater than the bore and having the fluid medium disposed therein;

a first seal seated into the exterior surface of the wall of the main chamber and positioned around the shaft on a first side of the buffer chamber;

a second seal seated into the interior surface of the wall of the main chamber and positioned around the shaft on a second side of the buffer chamber;

a conduit extending from the buffer chamber to a port positioned on the exterior surface of the wall of the main chamber, and wherein faces of the first and second seals form upper and lower ends of the buffer chamber.

2. The sealing system of claim 1, wherein the fluid medium is a gas.

3. The sealing system of claim 1, wherein the fluid medium is a liquid.

4. The sealing system of claim 1, wherein the fluid medium is a mixture of liquid and gas.

5. The sealing system of claim 1, wherein the main chamber is enclosed and is configured to be in vacuum.

6. The sealing system of claim 1, comprising a high temperature stage configured for temperatures in excess of 1000° C. inside the main chamber.

7. The sealing system of claim 1, wherein the buffer chamber is configured to maintain a pressure that is greater than a pressure of the main chamber.

8. The sealing system of claim 1, wherein the buffer chamber is configured to maintain a pressure that is approximately equal to a pressure of the main chamber.

9. The sealing system of claim 1, wherein the buffer chamber is configured to maintain a pressure that is less than a pressure of the main chamber.

10. The sealing system of claim 1, wherein the buffer chamber is in vacuum.

11. The sealing system of claim 1, wherein the main chamber comprises a tribometer.

12. A method of sealing a high-pressure chamber of a sealing system, the sealing system comprising:

a main chamber having a fluid medium disposed therein;

a shaft extending through a bore formed through an exterior surface of a wall of the main chamber;

a buffer chamber formed between the exterior surface and an oppositely facing interior surface of the wall of the main chamber and around the shaft, the buffer chamber having a diameter that is greater than the bore and having the fluid medium disposed therein;

a first seal seated into the exterior surface of the wall of the main chamber and positioned around the shaft on a first side of the buffer chamber;

a second seal seated into the interior surface of the wall of the main chamber and positioned around the shaft on a second side of the buffer chamber;

a conduit extending from the buffer chamber to a first port positioned on the exterior surface of the wall of the main chamber, and wherein faces of the first and second seals form upper and lower ends of the buffer chamber; and the method comprising:

pressurizing the main chamber to a first pressure via a second port in fluid communication with the main chamber; and pressurizing the buffer chamber to a second pressure via a second port.

13. The method of claim 12, wherein the second pressure is greater than the first pressure.

14. The method of claim 12, wherein the main chamber is enclosed and is configured to be in vacuum.

15. The method of claim 12, comprising a high temperature stage configured for temperatures in excess of 1000° C. inside the main chamber.

16. The method of claim 12, wherein the buffer chamber is configured to maintain a pressure that is greater than a pressure of the main chamber.

17. The method of claim 12, wherein the buffer chamber is configured to maintain a pressure that is approximately equal to a pressure of the main chamber.

18. The method of claim 12, wherein the buffer chamber is configured to maintain a pressure that is less than a pressure of the main chamber.

19. The method of claim 12, wherein the buffer chamber is in vacuum.

20. The method of claim 12, wherein the main chamber comprises a tribometer.

* * * * *